(12) United States Patent
Weber

(10) Patent No.: US 9,508,132 B2
(45) Date of Patent: Nov. 29, 2016

(54) METHOD AND DEVICE FOR DETERMINING VALUES WHICH ARE SUITABLE FOR DISTORTION CORRECTION OF AN IMAGE, AND FOR DISTORTION CORRECTION OF AN IMAGE

(75) Inventor: Stefan Weber, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 14/113,145

(22) PCT Filed: Feb. 28, 2012

(86) PCT No.: PCT/EP2012/053317

§ 371 (c)(1),
(2), (4) Date: Dec. 27, 2013

(87) PCT Pub. No.: WO2012/143159

PCT Pub. Date: Oct. 26, 2012

(65) Prior Publication Data

US 2014/0198989 A1   Jul. 17, 2014

(30) Foreign Application Priority Data

Apr. 19, 2011   (DE) .......................... 10 2011 007 644

(51) Int. Cl.
  *G06K 9/48*   (2006.01)
  *G06T 5/00*   (2006.01)
  *G06K 9/52*   (2006.01)

(52) U.S. Cl.
  CPC ................. *G06T 5/006* (2013.01); *G06K 9/52* (2013.01)

(58) Field of Classification Search
  None
  See application file for complete search history.

(56) References Cited

U.S. PATENT DOCUMENTS

| | | | | |
|---|---|---|---|---|
| 5,912,988 A * | 6/1999 | Moore | ................. | G06K 9/6206 382/112 |
| 6,597,816 B1 * | 7/2003 | Altunbasak | ............. | G06T 5/006 348/241 |
| 2004/0207733 A1 * | 10/2004 | Nose | ...................... | G06T 3/0018 348/222.1 |
| 2004/0257454 A1 | 12/2004 | Pinto et al. | | |
| 2005/0174437 A1 | 8/2005 | Iga | | |
| 2006/0280376 A1 * | 12/2006 | Lei | ........................ | H04N 3/2335 382/275 |
| 2007/0097235 A1 | 5/2007 | Miller | | |
| 2007/0177037 A1 * | 8/2007 | Kurata | ............... | H04N 5/23248 348/241 |
| 2009/0070059 A1 * | 3/2009 | Heiden | .............. | G01M 11/0271 702/95 |
| 2010/0014770 A1 | 1/2010 | Huggett et al. | | |
| 2010/0110241 A1 | 5/2010 | Rao et al. | | |
| 2011/0044557 A1 * | 2/2011 | Abraham | ................ | G06T 5/006 382/275 |

FOREIGN PATENT DOCUMENTS

EP   1100261   5/2001

OTHER PUBLICATIONS

Altunbasak, Yucel, Russell M. Mersereau, and Andrew J. Patti. "A fast parametric motion estimation algorithm with illumination and lens distortion correction." Image Processing, IEEE Transactions on 12.4 (2003): 395-408. 14 pages.*
O'neill, Barrett. Elementary differential geometry. Academic press, 2006. 6 pages.*
International Search Report for PCT/EP2012/052839, issued on Jul. 23, 2012.
M. Embree: "Lecture 18: The SVD: Examples, Norms, Fundamental Subspaces, Compression", Oct. 23, 2009.

* cited by examiner

*Primary Examiner* — Sumati Lefkowitz
*Assistant Examiner* — Ryan P Potts
(74) *Attorney, Agent, or Firm* — Norton Rose Fulbright US LLP; Gerard Messina

(57) ABSTRACT

A method for determining values which are suitable for distortion correction of an image, including the following steps: a step of splitting a vector field, which is suitable for distortion correction of the image, into a sum of vector products, and a step of determining terms of the vector products as suitable values for distortion correction of the image.

4 Claims, 3 Drawing Sheets

METHOD AND DEVICE FOR DETERMINING VALUES WHICH ARE SUITABLE FOR DISTORTION CORRECTION OF AN IMAGE, AND FOR DISTORTION CORRECTION OF AN IMAGE

FIELD OF THE INVENTION

The present invention relates to a method for determining values which are suitable for distortion correction of an image, a method for distortion correction of an image composed of multiple pixels, a corresponding device, and a corresponding computer program product.

BACKGROUND INFORMATION

International Published Patent Appln. No. WO 02/078346 describes a method in which a source image that is distorted by camera optics is converted into a distortion-corrected target image with the aid of a tabular imaging rule. This conversion occurs directly during the reading out from the image sensor, and in real time. No, one, or multiple target pixels is/are assigned to each source pixel of the source image.

SUMMARY

Against this background, the present invention presents a method for determining values which are suitable for distortion correction of an image, a method for distortion correction of an image composed of multiple pixels, a device which uses at least one of these methods, and lastly, a corresponding computer program product, according to the independent patent claims. Advantageous embodiments result from the respective subclaims and the following description.

A vector field may be used for converting a distorted image into a distortion-corrected image. There is a very large memory requirement when the values of the vector field are stored in a memory of a device for distortion correction of the distorted image. The memory requirement may be reduced by describing the vector field via a combination of vector products, and, instead of the values of the vector field, storing the terms of the vector products in the memory of the device for distortion correction of the distorted image. For correcting distortion of the distorted image, the values of the vector field may be ascertained from the terms of the vector products with little computational effort.

A corresponding method for real time-capable image correction is suitable in particular for implementation on FPGA- or ASIC-based computing hardware. The method is characterized on the one hand by a computation rule which is as simple as possible, and on the other hand, optimally by a small memory requirement. Such a method thus differs from real time-capable methods currently used, which, although they meet the requirement of a computation rule which is as simple as possible, require a very large amount of memory space, and therefore specifically do not meet the requirement for a small memory requirement. The approach according to the present invention may be implemented, for example, in video-based driver assistance systems.

Using an image correction method presented herein, it is possible to dramatically reduce the memory space requirement compared to other methods, while keeping the complexity of the computation rule at a moderate enough level that the real-time capability of the method is maintained. In addition, in the case of ultrahigh-resolution video cameras, stereo video distortion correction which is tracked with respect to the run time may be carried out in real time.

The present invention provides a method for determining values which are suitable for distortion correction of an image, including the following steps:

splitting a vector field, which is suitable for distortion correction of the image, into a sum of vector products; and determining terms of the vector products as suitable values for distortion correction of the image.

The image may be an image recorded by an image detection device, for example a camera of a vehicle. The image is composed of a plurality of pixels. In the distortion correction, a distorted initial image is converted into a distortion-corrected image. In the process, a position of some or of all pixels of the initial image may be changed. The vector field may include an appropriate distortion rule for all pixels of the initial image. The vector field may thus include a vector for each pixel of the initial image which defines whether a position of a particular pixel is changed, and, if a change in the position occurs, to which position of the target image the pixel is shifted. The vector field may be present in the form of a mathematical model. During the splitting, a two-dimensional vector field may be split into a sum of external vector products. The sums of the vector products may be an approximate representation of the vector field. A sum of vector products may represent a linear combination. The terms of the vector products may each include individual values, or may be represented as a function. Particular values of the terms may be computed in the step of determining. Based on the values of the terms, an at least approximate representation of a shift vector of the vector field associated with the particular pixel may be determined for each pixel of the initial image by simple computing operations. The simple computing operations may include multiplications, as well as additions and multiplications of resulting products.

In a step of storing, the suitable values for distortion correction of the image may be stored in a memory of a device for distortion correction of the image. Thus, the values for the distortion correction may be accessed directly during the distortion correction without the need for redetermining the values for each distorted image to be corrected. If the distortion correction is carried out pixel for pixel, for a pixel to be instantaneously corrected, a shift vector corresponding to the pixel may be determined from the values for the distortion correction and used for shifting the pixel. Individual values for the distortion correction may be used for determining shift vectors of different pixels. This reduces the memory requirement compared to a method in which the shift vectors are stored. Since the shift vectors may be computed very rapidly from the values for the distortion correction, the distortion correction may be carried out very quickly.

In addition, the step of storing may include a step of compressing the suitable values for distortion correction of the image. The memory occupied by the values for the distortion correction may thus be further reduced. Decompression is carried out to use the values for the distortion correction.

According to one specific embodiment, in the step of splitting, the vector field may be split into a first linear combination having a first sum of first vector products and a second linear combination having a second sum of second vector products.

Moreover, the present invention provides a method for distortion correction of an image composed of multiple pixels, including the following steps:

selecting terms of vector products associated with a position of a pixel of the image, the sum of the vector products defining a suitable vector field that is suitable for distortion correction of the image;

combining the terms associated with the position of the pixel to form a shift value associated with the position of the pixel; and determining a corrected position of the pixel, based on the position of the pixel and the shift value associated with the position of the pixel, in order to correct distortion of the image.

The terms may have been determined in advance, using a method for determining values which are suitable for distortion correction of an image, and stored in a memory. First and second terms associated with a pixel may be selected as a function of a column and a row in which the pixel is situated. The shift value may be a shift vector which at least approximately corresponds to a shift vector of the vector field. A corrected position may be determined for each pixel of an initial image. The corrected position may correspond to the original position or may differ from the original position. The method may be repeated for all pixels of the initial image. The method steps for multiple pixels may be carried out simultaneously.

Due to the distortion correction, individual pixels of the initial image may no longer be present in the distortion-corrected image.

The pixel may be situated in a column of a plurality of columns and in a row of a plurality of rows. A number of first terms may be associated with each of the plurality of rows, and a number of second terms may be associated with each of the plurality of columns. The first terms associated with the row of the pixel and the second terms associated with the column of the pixel are selected in the step of selecting. For determining the shift value, the first terms and second terms selected in the step of selecting may be multiplied in pairs, and the resulting products added together, in the step of combining. The number of first terms in a row may correspond to the number of second terms in a column. The number may correspond to a number of summands of a linear combination.

A selection of first terms and second terms, associated with the position of the pixel, of a first linear combination which defines a first component of the vector field which is suitable for distortion correction of the image with respect to a first image direction may be carried out in the step of selecting. In addition, a selection of first terms and second terms, associated with the position of the pixel, of a second linear combination which defines a second component of the vector field which is suitable for distortion correction of the image with respect to a second image direction may be carried out. Combining the first terms and second terms, associated with the position of the pixel, of the first linear combination into a first shift value associated with the position of the pixel with respect to the first image direction may be carried out in the step of combining. Similarly, combining the first terms and second terms, associated with the position of the pixel, of the second linear combination into a second shift value associated with the position of the pixel with respect to the second image direction may be carried out. A determination of the corrected position of the pixel based on the position of the pixel and the first shift value and second shift value associated with the position of the pixel may be carried out in the step of determining. The first component of the vector field may have previously been split into the first linear combination, and the second component of the vector field may have previously been split into the second linear combination.

Thus, the first image direction may correspond to an orientation of a row of the image, and the second image direction may correspond to an orientation of a column of the image. The first linear combination may thus relate to a shift of the pixel in the x direction, for example in the direction of a progression of the rows of the image. The second linear combination may relate to a shift of the pixel in the y direction, for example in the direction of a progression of the columns of the image.

The pixel together with information concerning the position of the pixel within the image may be received via an interface with an image detection device in a step of receiving. The pixel together with information concerning the corrected position of the pixel may be output in a step of outputting.

Moreover, the present invention provides a device which is designed to carry out or implement steps of the method according to the present invention in appropriate devices. Also as a result of this embodiment variant of the present invention in the form of a device, the object of the present invention may be achieved quickly and efficiently.

In the present context, a device may be understood to mean an electrical device which processes sensor signals, and as a function thereof emits control signals. The device may have an interface which may be formed by hardware and/or software. In a hardware design, the interfaces may be, for example, part of a so-called system ASIC which contains various functions of the device. However, it is also possible for the interfaces to be dedicated integrated circuits, or to be composed, at least in part, of discrete components. In a software design, the interfaces may be software modules which are present, for example, on a microcontroller in addition to other software modules.

Also advantageous is a computer program product having program code which may be stored on a machine-readable carrier such as a semiconductor memory, a hard drive memory, or an optical memory, and used for carrying out the method according to one of the above-described specific embodiments when the program is executed on a device which corresponds to a computer.

DETAILED DESCRIPTION

Figure 1:
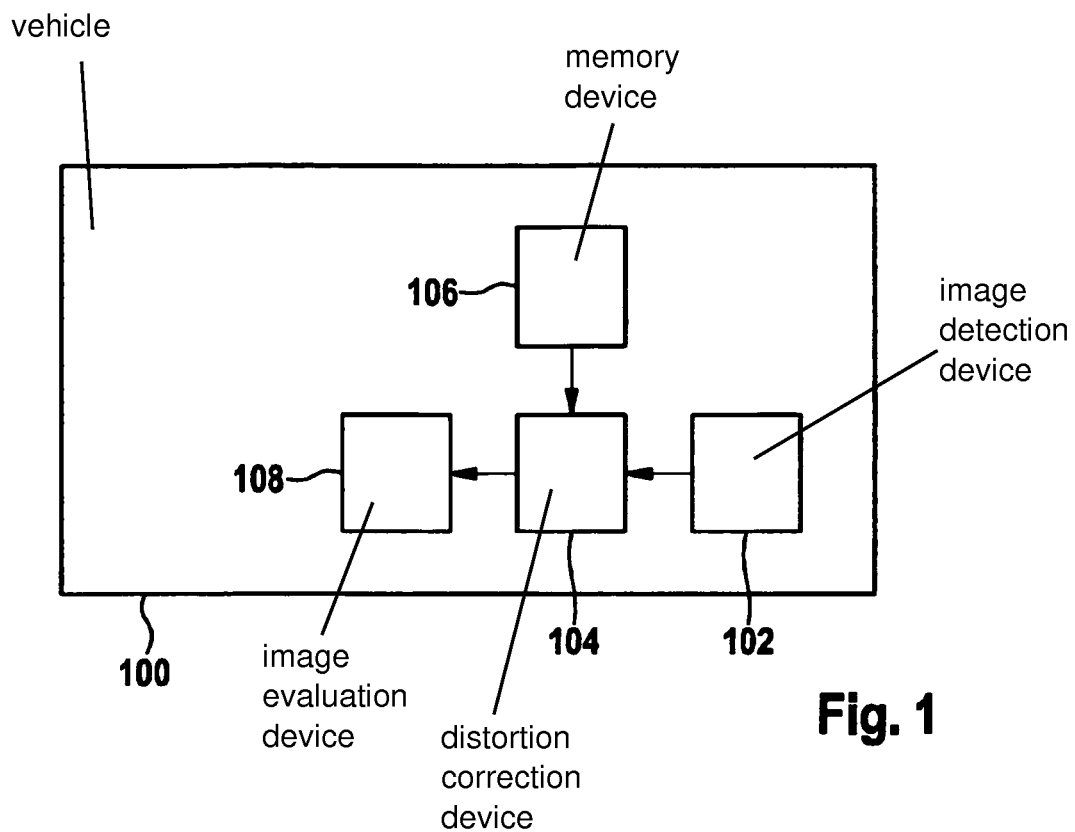
FIG. 1 shows a block diagram of one exemplary embodiment of the present invention.

In the following description of preferred exemplary embodiments of the present invention, the same or similar reference numerals are used for the functionally equivalent elements illustrated in the various figures, so that a repeated description of these elements is dispensed with.

FIG. 1 shows a vehicle 100 having an image detection device 102, a distortion correction device 104, a memory device 106, and an image evaluation device 108 according to one exemplary embodiment of the present invention. Image detection device 102 may be a camera which is designed to monitor the surroundings or an interior of vehicle 100. Image detection device 102 is designed to detect images in a time sequence and provide the image information in the form of pixels to distortion correction device 104 via an interface. Distortion correction device 104 is designed to correct distortion of the image received from image detection device 102, and to provide same as a distortion-corrected image to image evaluation device 108 via a further interface. Image evaluation device 108 may carry out object recognition, for example, based on the distortion-corrected image.

To correct distortion of the image, distortion correction device 104 may determine a distortion correction vector for each pixel of the image. A position of the pixels may be corrected corresponding to the distortion correction vectors in order to correct distortion of the image. The distortion correction vectors may be determined by distortion correction device 104 for each pixel. Each distortion correction vector may be determined based on predetermined values. The predetermined values may be stored in memory device 106 and read out from memory device 106 by distortion correction device 104 via a further interface.

Figure 2:
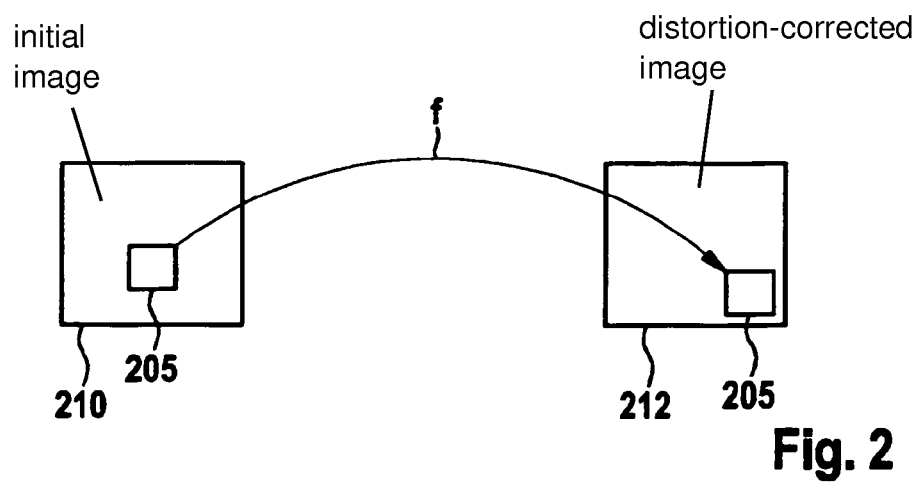
FIG. 2 shows a schematic illustration of a distortion correction of an image according to one exemplary embodiment of the present invention.

FIG. 2 shows a schematic illustration of a distortion correction of an image according to one exemplary embodiment of the present invention. An initial image 210 is converted into a distortion-corrected image 212. Pixels of image 210 are arranged in a plurality of columns and a plurality of rows. As an example, a pixel 215 is shown which is shifted from an original position in initial image 210 to a new position in distortion-corrected image 212. The shift takes place based on a distortion correction rule which is defined by a vector field f. A corresponding distortion correction vector for pixel 215 may be determined by the distortion correction device shown in FIG. 1 and applied to pixel 215.

The distortion correction of an image is described by vector field f: $R^2 \rightarrow R^2$, which represents the spatial shift of the image information. For correction of the image, each image position (u, v) is shifted by vector f (u, v):=(dx, dy).

Typical real time-capable methods are rapid since they hold all shift vectors in memory for the complete image, and as the computation rule therefore only have to carry out the shift. In contrast, a method according to the present invention has a computation rule which requires a small number of simple computing operations, but which requires much less memory space.

Figure 3:
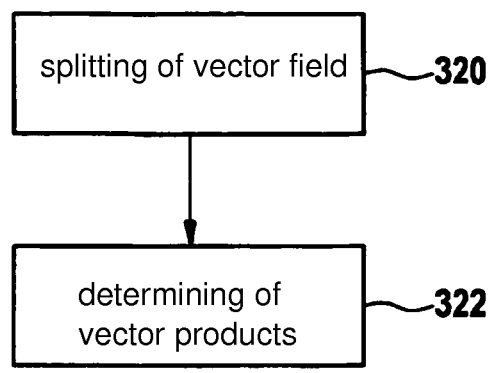
FIG. 3 shows a flow chart of a method for determining values which are suitable for distortion correction of an image according to one exemplary embodiment of the present invention.

FIG. 3 shows a flow chart of a method for determining values which are suitable for distortion correction of an image according to one exemplary embodiment of the present invention.

A vector field which is suitable for distortion correction of an image is split into two linear combinations, each including first terms and second terms, in a step 320. The vector field may be a mathematical model of vector field f shown in FIG. 2. The first terms and second terms may each be represented as a function.

The first terms and second terms of the at least one linear combination are determined as suitable values for distortion correction of the image in a step 322. The values of the terms may be subsequently stored, for example in the memory device shown in FIG. 1, and used for the distortion correction of images. The method may, for example, be carried out once after each calibration of the detection device shown in FIG. 1.

According to one exemplary embodiment, it is assumed below that a suitable mathematical model of vector field f is present. The underlying concept is to find a mathematical factorization off (u, v)

$$f(u,v) := \begin{pmatrix} f^x(u,v) \\ f^y(u,v) \end{pmatrix} \approx \begin{pmatrix} \sum_{k=1}^{n} g_k^x(u) \cdot h_k^x(v) \\ \sum_{k=1}^{n} g_k^y(u) \cdot h_k^y(v) \end{pmatrix}$$

so that components $f^x$ (u, v) and $f^y$ (u, v) break down into linear combinations $$\sum_{k=1}^{n} g_k(u) \cdot h_k(v).$$

According to this exemplary embodiment, functions $g_k$ (u) and $h_k$ (v) are computed "offline" and then persistently stored on target hardware in the form of lookup tables (LUTs). The functions themselves may therefore be quite complicated, and may be easily computed on external PC hardware, also with the aid of a computer algebra system.

Figure 4:
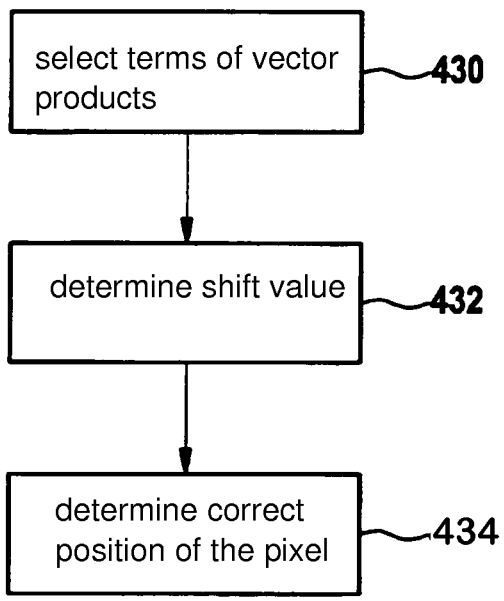
FIG. 4 shows a flow chart of a method for distortion correction of an image composed of multiple pixels according to one exemplary embodiment of the present invention.

FIG. 4 shows a flow chart of a method for distortion correction of an image composed of multiple pixels according to one exemplary embodiment of the present invention.

First terms and second terms of a first linear combination and first terms and second terms of a second linear combination which are predetermined for a position of a pixel are selected in a step 430. For this purpose, the terms may be read out from the memory device shown in FIG. 1, for example. The first terms and second terms corresponding to the linear combinations are combined in a step 432 to form a shift value which is associated with the position of the pixel. A corrected position of the pixel is determined in a step 434. For this purpose, the original position of the pixel, for example the pixel shown in FIG. 2, is shifted by the value of the shift value determined in step 432.

According to one exemplary embodiment, on the target hardware itself, for example the distortion correction device shown in FIG. 1, it is necessary only to evaluate the following linear combination:

$$dx := LH_1^x(j) \cdot LV_1^x(i) + \ldots + LH_n^x(j) \cdot LV_n^x(i) = \sum_{k=1}^{n} LH_k^x(j) \cdot LV_k^x(i)$$

$$dy := LH_1^y(j) \cdot LV_1^y(i) + \ldots + LH_n^y(j) \cdot LV_n^y(i) = \sum_{k=1}^{n} LH_k^y(j) \cdot LV_k^y(i)$$

In comparison to the direct storing of the vector field, the method presented here requires only $$100 \frac{n \cdot (\text{image width} + \text{image height})}{\text{image width} \cdot \text{image height}} [\%]$$

percent of memory, which for an image size of 1024×512, for n=4, corresponds to only 1.18%. Under the assumption that the LUTs are reasonably homogeneous, the required memory may also be further reduced by compression. Examples of suitable methods in this regard are run length encoding or interpolation of the undersampled LUTs.

Figure 5:
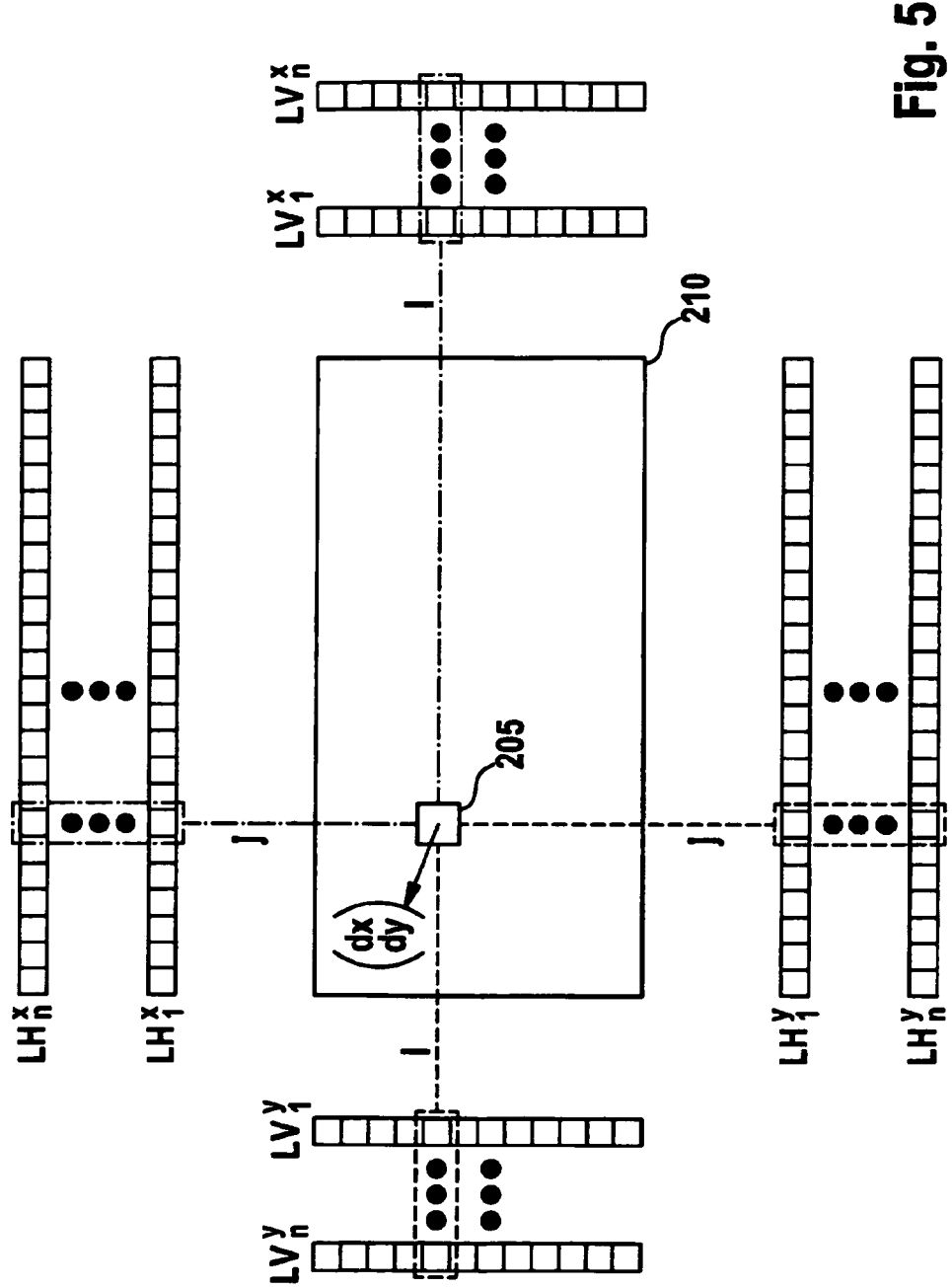
FIG. 5 shows a schematic illustration of a distortion correction of an image according to one exemplary embodiment of the present invention.

FIG. 5 shows a schematic illustration of a distortion correction of an image according to one exemplary embodiment of the present invention. Shown are an image area 210 and, as an example, a pixel 215 at a position (i, j). A column in which pixel 215 is present is denoted by j, and a row in which pixel 215 is present is denoted by i. To correct image area 210 for distortion, pixel 215 is shifted in the x direction, in the present case along a row, by value dx, and is shifted in the y direction, in the present case along a column, by value dy.

To ascertain value dx, stored first terms $LH_1^x \ldots LH_n^x$ and second terms $LV_i^x \ldots LV_n^x$ of a first linear combination are accessed. Values $LH_1^x(j) \ldots LH_n^x(j)$ associated with position j and values $LV_1^x(i) \ldots LV_n^x(i)$ associated with position i are selected. Value dx is computed according to $$dx := LH_1^x(j) \cdot LV_1^x(i) + \ldots + LH_n^x(j) \cdot LV_n^x(i).$$

To ascertain value dy, first terms $LH_1^y \ldots LH_n^y$ and second terms $LV_1^y \ldots LV_n^y$ of a second linear combination are accessed. Values $LH_1^y(j) \ldots LH_n^y(j)$ associated with position j and values $LV_q^y(i) \ldots LV_n^y(i)$ associated with position i are selected. Value dy is computed according to $$dy := LH_1^y(j) \cdot LV_1^y(i) + \ldots + LH_n^y(j) \cdot LV_n^y(i).$$

Thus, n second terms of the first linear combination and n second terms of the second linear combination are associated with each row. Similarly, n first terms of the first linear combination and n first terms of the second linear combination are associated with each column. n corresponds to the number of summands per linear combination.

The approach according to the present invention may be used, for example, for a lens distortion, a stereo rectification, or a combination of the two. The splitting of the vector field may be carried out as single value splitting. In addition, the described approach may be implemented using a one-dimensional lookup table and reconstruction of the vector field as a scalar product.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment. Furthermore, method steps according to the present invention may be repeated, and carried out in a sequence different from that described.

What is claimed is:

1. A method for distortion correction of an image composed of multiple pixels, comprising:
   (1) obtaining, by a distortion correction device and from an image detecting device, an image composed of a plurality of pixels, each of the pixels being assigned a coordinate of the image, each coordinate being defined by a respective position in a first image direction and a respective position in a second image direction, wherein:
      each of the positions in the first image direction corresponds to a respective column and each of the positions in the second image direction corresponds to a respective row, so that all of the pixels that are assigned coordinates defined by a same position in the first image direction belong to a same respective one of the columns and all of the pixels that are assigned coordinates defined by a same position in the second image direction belong to a same respective one of the rows;
      for each of the columns, a storage device stores in association with the respective column a respective set of 'n' first terms; and
      for each of the rows, the storage device stores in association with the respective row a respective set of 'n' second terms;
   (2) for each of the plurality of pixels of the image:
      selecting, by the distortion correction device and from the storage device, the respective set of 'n' first terms stored in association with the respective column to which the respective pixel belongs;
      selecting, by the distortion correction device and from the storage device, the respective set of 'n' second terms stored in association with the respective row to which the respective pixel belongs;
      for each of the 'n' first terms of the selected respective set of 'n' first terms, pairing the respective first term with, and multiplying the respective first term by, a respective term of the selected respective set of 'n' second terms, thereby forming a plurality of products associated with the respective pixel of the image;
      summing the products to form a respective shift value for the respective pixel; and
      updating the coordinate assigned to the respective pixel by shifting, based on the respective shift value, one of the respective pixel's position in the first image direction and the respective pixel's position in the second image direction; and
   (3) outputting a corrected version of the obtained image in which the plurality of pixels are positioned according to the updated coordinates.

2. A method for distortion correction of an image composed of multiple pixels, comprising:
   (1) obtaining, by a distortion correction device and from an image detecting device, an image composed of a plurality of pixels, each of the pixels being assigned a coordinate of the image, each coordinate being defined by a respective position in a first image direction and a respective position in a second image direction, wherein:
      each of the positions in the first image direction corresponds to a respective column and each of the positions in the second image direction corresponds to a respective row, so that all of the pixels that are assigned coordinates defined by a same position in the first image direction belong to a same respective one of the columns and all of the pixels that are assigned coordinates defined by a same position in the second image direction belong to a same respective one of the rows;
      for each of the columns, a storage device stores in association with the respective column a respective first set of 'n' first terms and a respective second set of 'n' first terms; and
      for each of the rows, the storage device stores in association with the respective row a respective first set of 'n' second terms and a respective second set of 'n' second terms;
   (2) for each of the plurality of pixels of the image:
      selecting, by the distortion correction device and from the storage device, the respective first and second sets of 'n' first terms stored in association with the respective column to which the respective pixel belongs;

selecting, by the distortion correction device and from the storage device, the respective first and second sets of 'n' second terms stored in association with the respective row to which the respective pixel belongs;

for each of the 'n' first terms of the selected respective first set of 'n' first terms, pairing the respective first term with, and multiplying the respective first term by, a respective term of the selected respective first set of 'n' second terms, thereby forming a first plurality of products associated with the respective pixel of the image;

summing the first plurality of products to form a respective first shift value for the respective pixel;

for each of the 'n' first terms of the selected respective second set of 'n' first terms, pairing the respective first term with, and multiplying the respective first term by, a respective term of the selected respective second set of 'n' second terms, thereby forming a second plurality of products associated with the respective pixel of the image;

summing the second products to form a respective second shift value for the respective pixel; and updating the coordinate assigned to the respective pixel by:

shifting, based on the respective first shift value, the respective pixel's position in the first image direction; and shifting, based on the respective second shift value, the respective pixel's position in the second image direction; and (3) outputting a corrected version of the obtained image in which the plurality of pixels are positioned according to the updated coordinates.

3. The method of claim 2, wherein:

each pixel's respective first shift value represents a respective first linear combination that defines a first component of a respective vector of a vector field, which respective vector is assigned to the respective pixel;

each pixel's respective second shift value represents a respective second linear combination that defines a second component of the respective vector of the vector field; and each of the vectors of the vector field is assigned to, and defines a respective shift in the first and second image directions of, a respective one of the pixels of the obtained image.

4. The method of claim 2, wherein for each of the plurality of pixels:

the respective first shift value of the respective pixel is calculated as $\Sigma_{k=1}^{n} LH_k^x(j) = LV_k^x(t)$;

the respective second shift value of the respective pixel is calculated as $\Sigma_{k=1}^{n} LH_k^y(j) = LV_k^y(t)$;

'n' is the number of terms in each of the first and second sets;

'j' is the respective column of the considered pixel;

T is the respective row of the considered pixel;

'x' indicates the first image direction;

'y' indicates the second image direction;

$LH_{k=1}^x - LH_{k=n}^x$ is the respective first set of 'n' first terms stored for the column of the respective pixel;

$LH_{k=1}^y - LH_{k=n}^y$ is the respective second set of 'n' first terms stored for the column of the respective pixel;

$LV_{k=1}^x - LV_{k=n}^x$ is the respective first set of 'n' second terms stored for the row of the respective pixel; and $LV_{k=1}^y - LV_{k=n}^y$ is the respective second set of 'n' second terms stored for the row of the respective pixel.

* * * * *